S. D. SAMUELS.
Lemon-Squeezers.
No. 218,403. Patented Aug 12, 1879.
Fig: 1.
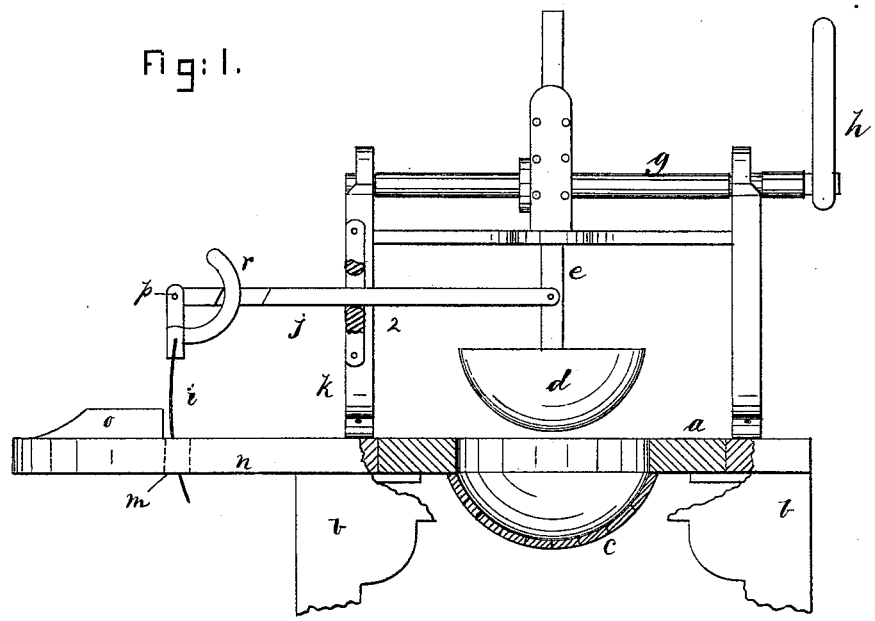
Fig: 2.
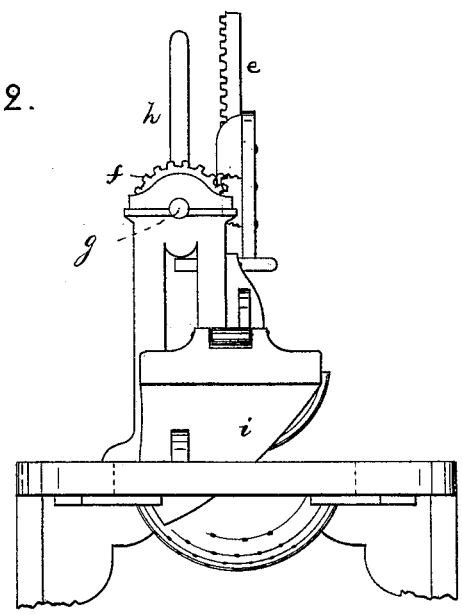
Witnesses.
Lawrence F. Connor.
Jos. P. Livermore
Inventor.
Samuel D. Samuels
by Crosby & Gregory
Attys

UNITED STATES PATENT OFFICE.

SAMUEL D. SAMUELS, OF BOSTON, MASSACHUSETTS, ASSIGNOR TO JOHN LYMAN, OF SAME PLACE.

IMPROVEMENT IN LEMON-SQUEEZERS.

Specification forming part of Letters Patent No. 218,403, dated August 12, 1879; application filed May 10, 1879.

*To all whom it may concern:*

Be it known that I, SAML. D. SAMUELS, of Boston, county of Suffolk, State of Massachusetts, have invented an Improvement in Lemon-Squeezers, of which the following description, in connection with the accompanying drawings, is a specification.

This invention has for its object the construction of a lemon squeezer and cutter, whereby a lemon may be cut or divided and then squeezed, thereby making a strong, serviceable apparatus, desirable for bar or hotel use.

Figure 1 represents, in side elevation and partially in section, a machine embodying my invention; and Fig. 2 is an end view thereof, a portion of which is broken away to show the parts more clearly.

The table-plate $a$ of the apparatus, mounted on legs $b$, and preferably made removable, has attached to it the perforated cup $c$, which forms the concaved part of the squeezing device, into which enters the convexed member or presser $d$, which is carried at one end of the rack-bar $e$, reciprocated by the pinion $f$ on the shaft $g$, which may be turned by the handle $h$.

Before squeezing the lemon it is to be halved, and for many purposes it is customary to slice it, as for salads, &c.; and to do this efficiently I have provided the tapering blade $i$, which is attached to the lever $j$, which has its fulcrum at 2, next the standard $k$, the said lever deriving its motion from the rack-bar, with which it is connected at one end.

The blade is curved, and its end descends through a slot, $m$, (shown in dotted lines, Fig. 1,) in the extension-plate $n$. On this extension-plate is a gage, $o$, against which to place the lemon while being sliced, so as to graduate the thickness of the slice.

The blade is hinged to the lever $j$ at $p$, so that it may pass readily down through the slot $m$, and the guide $r$ keeps the blade from twisting the hinge-joint $p$.

It is obvious that the perforated cup and presser may be of any size, according to the number of lemons to undergo pressure at one time.

I claim—

As an article of manufacture, the herein-described lemon squeezer and cutter, composed of the perforated cup $c$, presser $d$, rack-bar $e$, and devices to actuate the rack-bar, the cutting-blade $i$ and its lever $j$, actuated as described, and the extension-plate $n$, as and for the purpose set forth.

In testimony whereof I have signed my name to this specification in the presence of two subscribing witnesses.

SAMUEL D. SAMUELS.

Witnesses:
L. F. CONNOR,
JOS. P. LIVERMORE.